US006327091B1

(12) United States Patent
Agano

(10) Patent No.: US 6,327,091 B1
(45) Date of Patent: Dec. 4, 2001

(54) COLLIMATING PLATE AND BACKLIGHT SYSTEM

(75) Inventor: Toshitaka Agano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/484,461

(22) Filed: Jan. 18, 2000

(30) Foreign Application Priority Data

Jan. 18, 1999 (JP) .................................................. 11-009281

(51) Int. Cl.[7] ........................... G02B 27/10; G02B 27/30; G03B 21/60
(52) U.S. Cl. .......................... 359/619; 359/452; 359/454; 359/641
(58) Field of Search ...................... 359/619, 620, 359/290, 452, 454, 455, 456, 237, 492, 536, 537, 542, 641

(56) References Cited

U.S. PATENT DOCUMENTS

| 5,429,909 | | 7/1995 | Kaszczuk et al. | 430/273 |
|---|---|---|---|---|
| 5,563,738 | * | 10/1996 | Vance | 359/443 |
| 5,751,388 | * | 5/1998 | Larson | 349/96 |
| 5,781,344 | * | 7/1998 | Vance | 356/614 |
| 5,839,812 | * | 11/1998 | Ge et al. | 362/31 |
| 6,163,351 | * | 12/2000 | Nakayama | 349/61 |
| 6,172,814 | * | 1/2001 | Watanabe et al. | 359/619 |
| 6,254,245 | * | 7/2001 | Uehara | 362/31 |

FOREIGN PATENT DOCUMENTS

| 2 083 726 A | 3/1982 | (GB) | H04N/1/22 |
|---|---|---|---|
| 3-87827 | 4/1991 | (JP) | G03F/7/004 |
| 4-211252 | 8/1992 | (JP) | G03F/7/004 |
| 5-333202 | 12/1993 | (JP) | G02B/5/02 |
| 6-67003 | 3/1994 | (JP) | G02B/5/02 |
| 6-230230 | 8/1994 | (JP) | G02B/6/00 |
| 7-5306 | 1/1995 | (JP) | G02B/5/02 |
| 7-174909 | 7/1995 | (JP) | G02B/5/02 |
| 9-104173 | 4/1997 | (JP) | B41M/5/26 |
| 9-104174 | 4/1997 | (JP) | B41M/5/26 |
| 10-226174 | 8/1998 | (JP) | B41M/5/26 |

\* cited by examiner

Primary Examiner—Georgia Epps
Assistant Examiner—Saeed Seyrafi
(74) Attorney, Agent, or Firm—Sughrue, Mion, Zinn, Macpeak & Seas, PLLC

(57) ABSTRACT

There is provided a collimating plate including a transparent support, a multiple of light transmitting spheres fixed to the support in partial contact therewith and a light blocking area that blocks passage of light through areas other than light transmitting areas composed of areas of contact between the support and the spheres and nearby areas. There is also provided a backlight system including the collimating plate and a housing that is optically closed by the collimating plate and that includes an inner surface having reflecting properties. They can produce adequately convergent collimated light the intensity of which drops by 50% at angles of no more than ± 15 degrees, thereby realizing a liquid-crystal display that can provide a sufficiently good contrast ratio over a wide range of viewing angles to be advantageously used in medical applications.

7 Claims, 3 Drawing Sheets

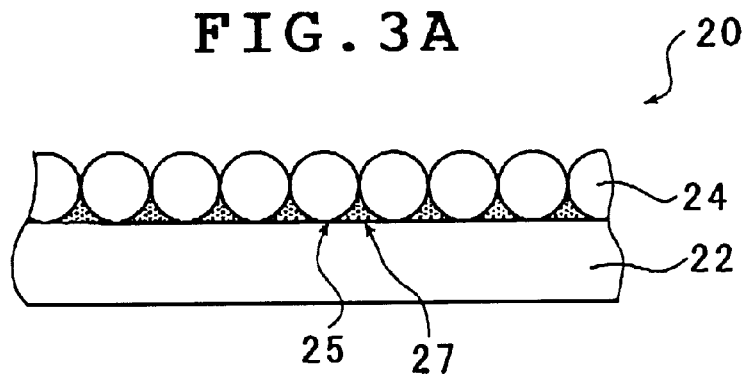
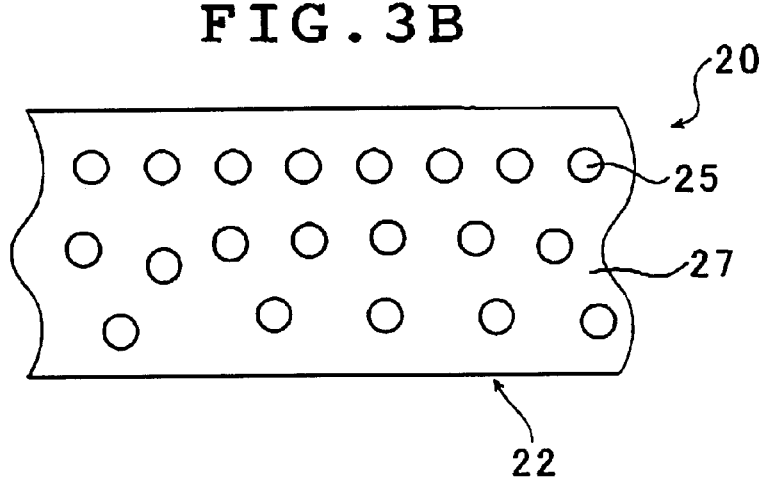
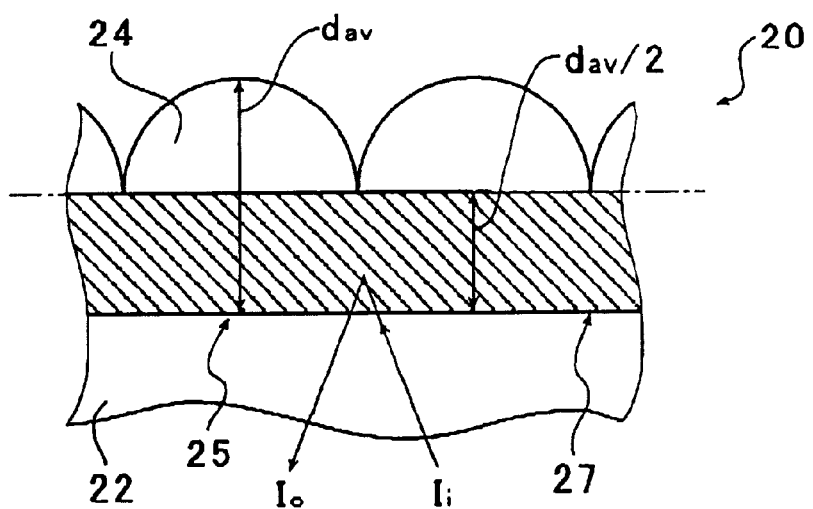

COLLIMATING PLATE AND BACKLIGHT SYSTEM

BACKGROUND OF THE INVENTION

This invention relates to the technical field of collimating plates for collimating diffused light and backlight systems utilizing them. More particularly, the invention relates to a collimating plate that can produce adequately convergent collimated light and which hence is particularly suitable for use as a backlight for liquid-crystal displays, and a backlight system utilizing it.

The use of liquid-crystal displays (LCDs) as a display for word processors and computers is rapidly increasing today. The use of LCDs as a monitor in ultrasonic, CT and MRI diagnostic apparatus is under review. Conventionally, these medical diagnostic apparatus have primarily used CRTs (cathode-ray tubes) as a monitor.

LCDs have many advantages such as ease in size reduction, small thickness and lightweightness. On the other hand, they have poor viewing angle characteristics (narrow viewing angle) in that as the viewing direction or angle changes, the contrast ratio of an image decreases sharply and the gradation also reverses to have the image look differently. As a result, depending on the position of the viewer, the image cannot be viewed correctly.

In medical applications as described above, diagnosis with monitors is based on the difference in image density, so not only is it required to produce an image of high contrast ratio but at the same time, incorrect recognition of an image can cause wrong diagnosis or inconsistency in the results of diagnoses. Under these circumstances, it is required that high-contrast image be displayed over a wide range of viewing angles. Another problem peculiar to medical monitors is that image is usually displayed in monochrome (black and white colors) and, hence, suffers considerable drop in contrast as the viewing angle varies.

LCDs adapted for viewing over a wide range of angles include those operating in an IPS (in-plane switching) mode and a MVA (multi-domain vertical alignment) mode. However, even these LCDs do not have a sufficiently wide range of viewing angles to satisfy the requirement of monochromatic images, especially ones that are used in medical applications.

A LCD is known that can produce image of good contrast ratio over a wide range of viewing angles. It is backlighted with collimated light (which travels straight) and the light passing through the liquid-crystal panel is diffused with a diffusing plate.

In order to realize a wide-angle LCD, the diffused light issuing from the backlight source has to be condensed sufficiently to produce adequately collimated light. In particular, in order to realize a LCD that has a sufficiently wide range of viewing angles to be useful in medical applications, it is preferred to use collimated light the intensity of which drops by 50% at angles of no more than ±15 degrees.

Collimated light is usually produced by making diffused light convergent with a condensing sheet. The collimated light produced from conventional condensing sheets is reduced in intensity by 50% at angles of about ±20 degrees and it has been difficult to produce collimated light that practically serves to backlight LCDs for medical use.

SUMMARY OF THE INVENTION

The present invention has been accomplished under these circumstances and has as an object providing a collimating plate that has a sufficiently good condensing capability to produce collimated light the intensity of which drops by 50% at angles of no more than ±15 degrees and which, when used as a collimator with backlight for liquid-crystal displays, provides a good contrast ratio over a wide range of viewing angles to realize a liquid-crystal display that can advantageously be used as a monitor for medical diagnostic apparatus. Another object of the invention is to provide a backlight system utilizing the collimating plate.

In order to attain these objects, according to a first aspect of the invention, there is provided a collimating plate comprising:

a transparent support;

a multiple of light transmitting spheres fixed to the support in partial contact therewith; and a light blocking area that blocks passage of light through areas other than light transmitting areas composed of areas of contact between the transparent support and the light transmitting spheres and nearby areas.

Preferably, the light transmitting areas have an open area ratio of 3–10% to a surface of the transparent support.

The light blocking area is preferably one of a light diffusing device, a light absorbing device and a light reflecting device. Further, the light diffusing device is preferably a binder that fixes the light transmitting spheres to the transparent support and in which a substance having a refractive index of at least 1.3 is dispersed. Furthermore, the light diffusing device has preferably a reflectance of at least 80% at a thickness one half average diameter of the light transmitting spheres.

According to a second aspect of the invention, there is also provided a backlight system comprising:

a collimating plate comprising a transparent support, a multiple of light transmitting spheres fixed to the support in partial contact therewith and a light blocking area that blocks passage of light through areas other than light transmitting areas composed of areas of contact between the transparent support and the light transmitting spheres and nearby areas; and a housing that is optically closed by the collimating plate and that includes an inner surface having reflecting properties. It should be noted that the housing has light sources inside.

The inner surface of the housing has preferably a reflectance of at least 80%.

BRIEF DESCRIPTION OF THE DRAWINGS

FIGS. 3A and 3B are a cross sectional view and a bottom view showing in conceptual form an embodiment of the collimating plate of the invention, respectively;

FIG. 5 is a cross sectional view showing in conceptual form the collimating plate according to a preferred embodiment of the invention.

DETAILED DESCRIPTION OF THE INVENTION

The collimating plate and the backlight system utilizing it according to the invention are described below in detail with reference to the preferred embodiments shown in the accompanying drawings.

Figure 1:
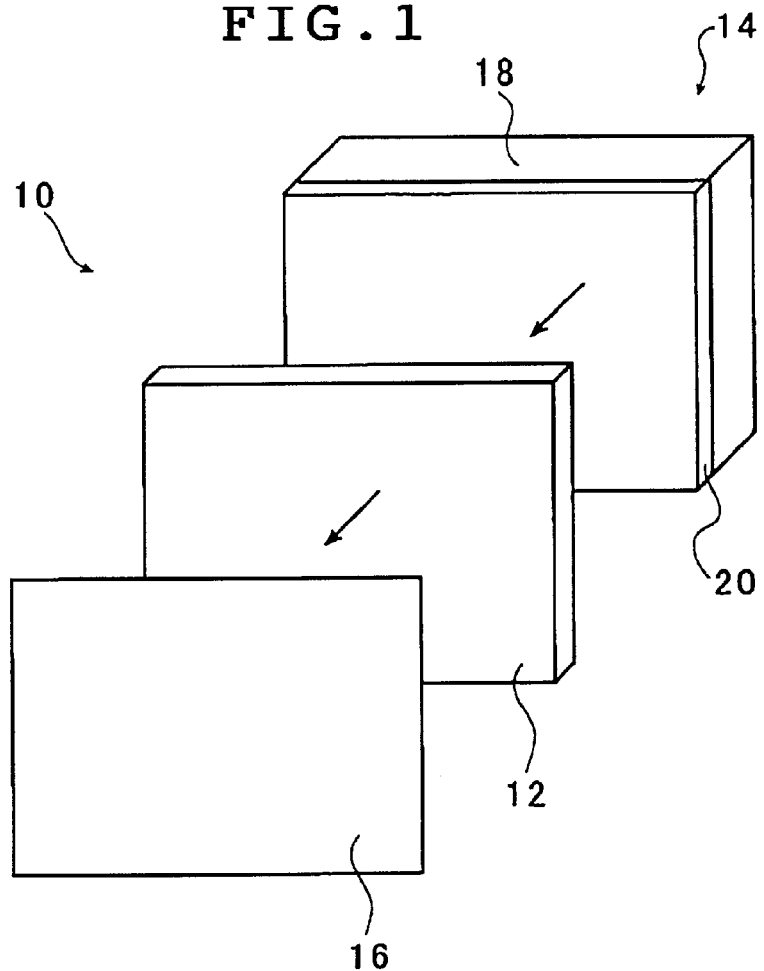
FIG. 1 is an exploded perspective view showing in conceptual form an exemplary display device utilizing the collimating plate and the backlight system utilizing it according to the invention.

FIG. 1 shows in conceptual form an exemplary display device that utilizes the backlight system in the second aspect of the invention using the collimating plate in the first aspect of the invention. The display device generally indicated by 10 in FIG. 1 is a so-called liquid-crystal display (hereunder referred to as LCD) that utilizes a liquid-crystal panel 12 as an image display unit. It is composed of the liquid-crystal panel 12, a light diffusing plate 16 that diffuses the image-bearing light that has passed through the liquid-crystal panel 12, and a backlight 14 that utilizes the collimating plate 20 of the invention to ensure that collimated light (which travels straight) is incident on the liquid-crystal panel 12. It should be noted here that the backlight 14 applies the backlight system of the invention. The liquid-crystal panel 12 is connected to its driver (not shown) and the display device 10 is combined with any necessary members that are included in a known LCD.

The display device 10 that includes the collimating plate 20 of the invention and the backlight 14 utilizing the collimating plate 20 and applying the backlight system, provides high contrast ratio over a wide range of viewing angles and, hence, can advantageously be used as a monitor for medical diagnostic apparatus.

In the display device 10 utilizing the collimating plate 20 of the invention and the backlight 14, the liquid-crystal panel 12 may be a known liquid-crystal panel used in various kinds of LCDs that has a liquid-crystal sandwiched between two spaced transparent supports, which are overlaid with transparent electrodes to produce a sheet assembly having an analyzer on one side and a polarizer on the other side.

Hence, the liquid-crystal panel 12 may be of a full-color or monchromatic type and can be operated in all known modes including a TN (twisted nematic) mode, a STN (supertwisted nematic) mode, an ECB (electrically controlled birefringence) mode, an IPS mode and a MVA mode. Among these, operation in the TN mode is particularly advantageous. Liquid-crystal display in the TN mode has rather poor viewing angle characteristics but compared to the IPS and MVA modes that allow for wider viewing angles, the TN mode has the advantage of simplifying the construction of the liquid-crystal panel. Therefore, liquid-crystal panels of high resolution can be backlighted at an increased utilization factor to facilitate the display of highly precise image.

The liquid-crystal panel 12 also has no limitations on the switching device or the matrix.

The light diffusing plate 16 also is not limited in any particular way and various known types of light diffusing plates (sheets) may be employed. Preferred light diffusing plates include: the light diffusing plate described in Unexamined Published Japanese Patent Application (kokai) No. 333202/1993 which has a transparent electron-conductive layer between a transparent support and a light diffusing layer; the light diffusing plate described in Unexamined Published Japanese Patent Application No. 67003/1994 which contains an organic polymeric binder and organic polymeric particles in one surface of a transparent support; the light diffusing plate described in Unexamined Published Japanese Patent Application No. 230230/1994 which comprises a transparent support having a light diffusing layer on one side and a backing layer on the other side which contains a binder and 0.0001–1 wt % (of binder) of organic polymeric particles that have a weight average size of 3 $\mu$m–25 $\mu$m and which partly project; the light diffusing plate described in Unexamined Published Japanese Patent Application No. 5306/1995 which comprises a transparent support, a light diffusing layer and a layer of crosslinked ion-conductive resin that is placed between the support and the light diffusing layer and which has a cationic quaternary ammonium base at side chains; and the light diffusing plate described in Unexamined Published Japanese Patent Application No. 174909/1995 which comprises a transparent support having on one side a diffusing layer containing an organic polymeric binder and organic polymeric particles, characterized in that the difference in refractive index between the binder and the particles is no more than 0.05, the particles have a weight average size of 10 $\mu$m–21 $\mu$m, the weight ratio between the binder and the particles is 1.9–3.6, the sum of their coating weights is 10 g/m$^2$–17 g/m$^2$, and the size distribution of the particles has a standard deviation of no more than 3.5 $\mu$m.

The diffusing plate 16 preferably has a black mask in the areas other than those which transmit light. This effectively reflects and diffuses extraneous light, thereby preventing the decrease in the contrast of the image being viewed.

Figure 2:
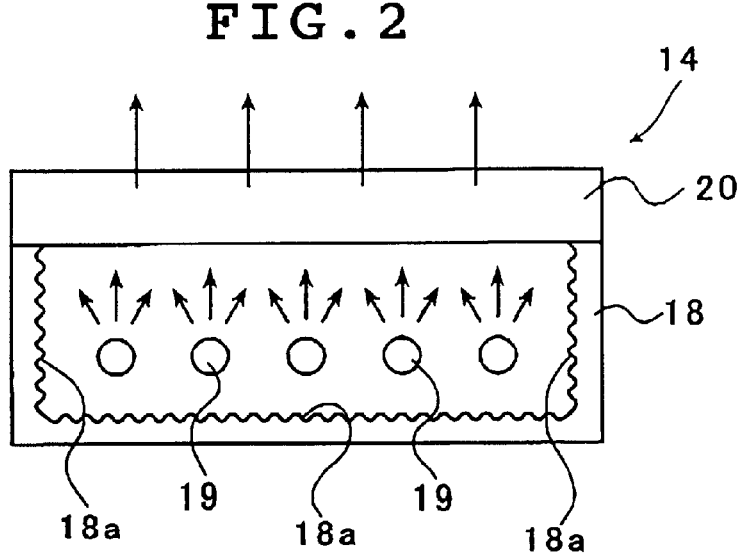
FIG. 2 is a cross sectional view that shows in conceptual form an embodiment of the backlight system of the invention utilizing the collimating plate of the invention.

The backlight 14 is a portion that forms the backlight system of the invention, and is a so-called collimating backlight system that issues collimated light (which travel straight) for displaying the image on the liquid-crystal panel 12, as shown in FIG. 2. The backlight 14 comprises a housing 18, light sources 19 placed within the housing 18, and the collimating plate 20 of the invention which condenses the light from the light sources 19 to emerge as collimated light and is constituted as a unit.

In the illustrated case, the housing 18 is a casing that is optically closed by the collimating plate 20, and an inner surface or inner wall surface 18a of the housing 18 has light reflecting properties. The shape of the housing 18 is not limited in any particular way, and the housing 18 may be in any shape, if optical confinement is achieved by means of the collimating plate 20. The reflectance of the inner wall surface 18a of the housing 18 is preferably 80% or more. Because, as will be described below, when the reflectance is 80% or more, the light utilization factor of the backlight system of the present invention at least exceeds that of the backlight of the ordinary liquid crystal display. Higher values are more preferred as the reflectance of the inner surface, and the reflectance of 100% is ideal. However, the housing 18 requires more cost for obtaining higher reflectance values. Then, the reflectance can be appropriately selected in accordance with the performance and cost required by the backlight system.

Further, the method and device for imparting the reflecting properties to the inner wall surface 18a of the housing 18 also are not limited in any particular way, and conventional known methods, devices and members can be employed. For example, as will be described in detail below, the light diffuser (binder 26) prepared by dispersing light diffusing substances such as fine particles of alumina, barium sulfate, titanium oxide, calcium carbonate or the like in various types of adhesives may be applied to the inner surface of the housing 18 or a thin metal film of aluminum (Al) or copper (Cu) may be deposited on the inner surface of the housing 18. The material of the housing 18 is not limited in any particular type, but an ordinary plastic or metal may be permissible.

As shown in FIGS. 3A and 3B, the collimating plate 20 of the invention comprises a transparent support 22, light transmitting spheres (hereunder simply referred to as "beads") that are fixed to the support 22 in partial contact therewith, and a light blocking area 27 (hereunder simply referred to as "blocking area") that blocks the passage of light through the areas other than light transmitting areas 25 composed of the areas of contact between the support 22 and the beads 24 and the nearby areas. The collimating plate 20 is placed and retained with the side carrying the beads 24 facing the liquid-crystal panel 12.

Figure 4A:
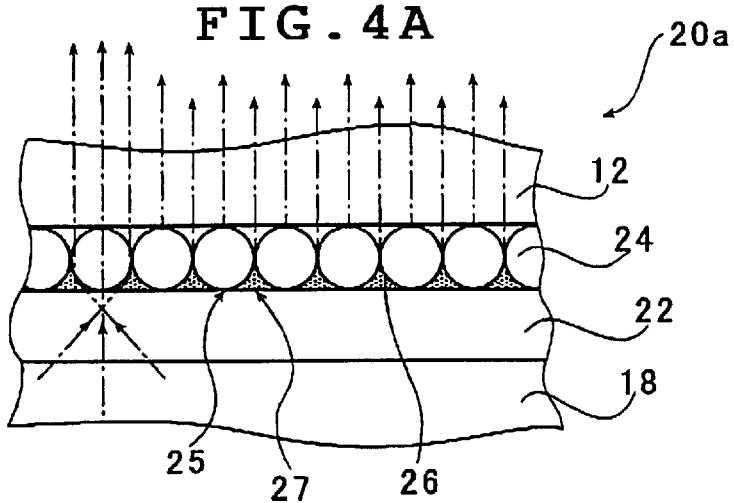
FIGS. 4A–4C are cross sectional views showing in conceptual form three embodiments of the collimating plate of the invention.
Figure 4B:
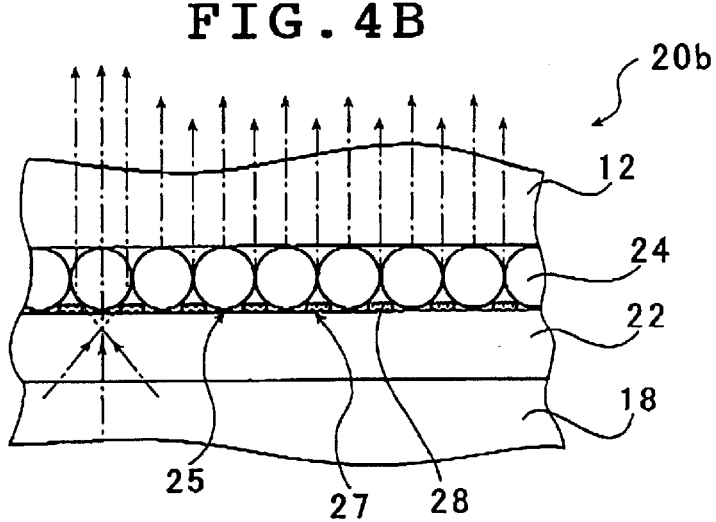

As shown in conceptual form in FIGS. 4A and 4B, diffusing light issued from the light sources 19 (see FIG. 2) is partly affected by the blocking area 27 and launched into the beads 24 only through the light transmitting areas 25 (see FIG. 3B) composed of the areas of contact between the beads 24 and the support 22 and the nearby areas, refracted by the spherical beads 24 and effectively condensed to become collimated. Therefore, the collimating plate 20 of the invention can produce adequately convergent collimated light the intensity of which is attenuated by 50% at angles of no more than ±15 degrees, while preventing the passage of diffused light. By using the collimating plate 20 of the invention, one can realize the display device 10 (LCD) that provides a good contrast ratio over a wide range of viewing angles.

The light sources 19 in the backlight 14 are not limited to any particular types as long as they are non-directional and can randomly issue the light in various directions and various backlight sources such as a fluorescent lamp used in known LCDs may be employed as long as they can issue sufficient quantities of light as the backlight sources in accordance with the application of the display device 10.

FIG. 4A shows in conceptual form an embodiment of the collimating plate of the invention. The collimating plate generally indicated by 20a comprises a light transmitting support sheet (transparent support) 22, beads 24 fixed to the support sheet 22 in partial contact therewith, and a binder 26 for fixing the beads 24. In the illustrated case, the binder 26 serves as the blocking area 27. Having a light diffusing substance dispersed therein, the binder 26 also serves as a light diffuser.

Light diffusing substances generally have the ability to reflect almost 100% of incident light without attenuation. Therefore, light that is incident on the light diffusing binder 26 rather than the beads 24 is little attenuated but substantially reflected by the light diffusing substance on the surface or in the bulk of the binder 26 and returned into the housing 18, where it is reflected by the inner wall surface 18a to make another entry into the collimating plate 20a, repeating the process just described above.

Therefore, according to the embodiment under consideration, the utilization factor of the light issued from the light sources 19 is so much increased as to permit the backlight 14 to operate with high efficiency.

The support sheet 22 is not limited to any particular types and it may be made of various materials as long as they have adequate light transmitting properties and also have sufficient mechanical strength for specific uses of the display device 10. Specific examples that can advantageously be used include various kinds of glass, as well as various kinds of resin materials including polyesters, polyolefins, polyamides, polyethers, polystyrenes, polyester amides, polycarbonates, polyphenylene sulfides, polyether esters, polyvinyl chloride and polymethacrylate esters.

The illustrated collimating plate 20a and other examples of the collimating plate of the invention may be rigid plates or flexible sheets or films and the constituent material, thickness and other features of the support sheet 22 may be selected as appropriate for the required mechanical strength and the intended use of the display device 10.

The beads 24 are light transmitting, (generally) spherical bodies (spheres) that are fixed to the support sheet 22 in partial contact therewith by means of the binder 26. The constituent material of the beads 24 is not limited to any particular types and various transparent materials may be employed. Examples are the above-listed constituent materials of the support sheet 22; for several reasons such as having satisfactory optical characteristics, (meth)acrylic resins and glass are used with advantage.

The adhesive to be used as the binder 26 is not limited to any particular types and various adhesives may be employed as long as they can fix the beads 24 to the support sheet 22. Advantageous examples include vinyl acetate resins, ethylene-vinyl acetate copolymers, vinyl chloride resins, vinyl chloride-vinylidene chloride copolymers, (meth) acrylate ester resins, butyral resins, silicone resins, polyesters, vinylidene fluoride resins, nitrocellulose resins, polystyrenes, styrene-acrylic copolymers, urethane resins, polyethylene, polypropylene, polyethylene chloride, rosin derivatives and mixtures thereof.

Acrylic resins and silicone resins are used with particular advantage.

As already mentioned, the binder 26 has the light diffusing substance dispersed therein to be capable of working as a light diffuser. The light diffusing substance is not limited to any particular types, except that substances having a refractive index of at least 1.3 are preferred. If this requirement is met, the difference in refractive index between the adhesive and the light diffusing substance is maintained at a sufficient value to achieve low-loss and highly efficient diffusion (reflection) of light.

Particularly advantageous examples of the light diffusing substance are the fine particles of alumina ($Al_2O_3$), barium sulfate ($BaSO_4$), titanium oxide ($TiO_2$) and calcium carbonate ($CaCO_3$). These fine particles are not (generally) spherical in shape but have many asperities on the surface. Therefore, gaps are formed between adjacent fine particles and the binder will not flow into the gaps, leaving many areas filled with air. Since these fine particles have a refractive index of about 1.7, a sufficiently great index difference from air (n=1) is assured in many areas within the binder 26 that highly efficient diffusion (reflection) of light can be realized while considerably reducing the attenuation that would occur in the bulk of the binder 26.

Particularly good results are attained in terms of adhesive strength and reflection efficiency if the volume ratio of the air in the binder 26 to the other components (i.e., adhesive and fine particles) is adjusted to lie between 1:4 and 3:2. This range of volume ratio can be attained by, for example, adjusting the weight ratio between the adhesive and the fine particles.

The size of the light diffusing substance is not limited to any particular values but fine particles of 0.2 $\mu$m–1.2 $\mu$m are advantageous.

The weight ratio of the adhesive to the light diffusing substance also is not limited to any particular values but in view of impeded passage of light through the collimating plate 20a, adhesive strength and reflection efficiency, the range of 5:1–50:1 is preferred.

FIG. 5 shows in conceptual form the design for achieving more efficient emergence of collimated light in the embodiment where the light diffuser is used as the blocking area 27 in the collimating plate 20 of the invention. As shown, the light diffuser (which is the binder 26 in the illustrated case) has a reflectance [emerging light $I_e$/incident light $I_i$] of at least 80% at a thickness one half the average diameter $d_{av}$ of the beads 24, as expressed by the following relation:

$$[I_o/I_i] \geq 80\% \text{ (at } d_{av}/2)$$

Hence, it is preferred that the weight ratio between the adhesive and the light diffusing substance, the constituent material of the light diffusing substance and its size are selected appropriately to satisfy said relation.

If the light diffusing substance is alumina or any one of the materials mentioned above, a reflectance of 80% can be attained at a thickness of about 20 $\mu$m. Hence, the average diameter $d_{av}$ of the beads 24 is preferably adjusted to 40 $\mu$m or more. If the size of the beads 24 is excessive, their shape becomes noise to the image and empirically the size of the beads 24 is preferably no more than 5 mm. With all these facts taken into consideration, the average diameter $d_{av}$ of the beads 24 is preferably adjusted between 40 $\mu$m and 5 mm, more preferably between 100 $\mu$m and 2 mm.

The method of fabricating the collimating plate 20a is not limited in any particular way. In one example, a dispersion of the beads 24 in the binder 26 is applied to the support sheet 22 and dried (cured). Alternatively, the binder 26 is applied to the support sheet 22 and the beads 24 are sprayed over the entire surface of the binder coat, which is subsequently dried.

In order to produce satisfactory collimated light in the invention, the amount of the binder 26 has to be adjusted in such a way that the beads 24 can be uniformly fixed to the entire surface of the support sheet 22 and that the beads 24 are not buried in the light diffuser, preferably all of them becoming exposed from the light diffuser by at least 50% of their height.

If necessary, the beads 24 may be pressed down or allowed to settle under gravity so that they come into contact with the support sheet 22; thereafter, the adhesive as the binder 26 is dried.

In the example described above, the light diffusing substance is dispersed in the binder 26 so that it works as the light diffuser (blocking area 27) to ensure that the diffused light from the light sources 19 in the backlight 14 is launched into the beads 24 only through the light transmitting areas 25 composed of the areas of contact between the beads 24 and the support sheet 22 and the nearby areas. However, this is not the sole case of the invention and a black mask may be formed as the blocking area 27 in the areas other than those of contact between the beads 24 and the support sheet 22 and the nearby areas. This black mask is also effective in accomplishing selective launching of diffused light in the manner just described above.

Take, for example, the case described in the previous paragraphs. A light absorbing agent such as carbon black, rather than the light diffusing substance, is dispersed in an adhesive to prepare the binder 26. In this way, one can fabricate a collimating plate that uses the binder 26 as a black mask to ensure that the diffused light from the light sources is launched into the beads 24 only through the light transmitting areas 25 composed of the areas of contact between the beads 24 and the support sheet 22 and the nearby areas.

According to this embodiment of using the black mask, convergence efficiency is somewhat lowered but the beads 24 are still effective in producing advantageously convergent collimated light.

A specific example of the embodiment of using the black mask in the collimating plate of the invention is shown in FIG. 4B, in which the collimating plate is generally indicated by 20b. As shown, using a light-sensitive, thermally developable material that forms no color in the exposed area by thermal development (which, therefore, is of a positive-acting) or a heat-sensitive ablative material, the black mask 28 as the blocking area 27 may be formed in the areas other than the light transmitting areas 25 composed of the areas of contact between the beads 24 and the support sheet 22 and the nearby areas. As is clear from FIG. 4B, diffused light is launched into the beads 24 only through the light transmitting areas 25 composed of the areas of contact between the beads 24 and the support sheet 22 and the nearby areas, thereby producing satisfactorily convergent collimated light.

Figure 4C:
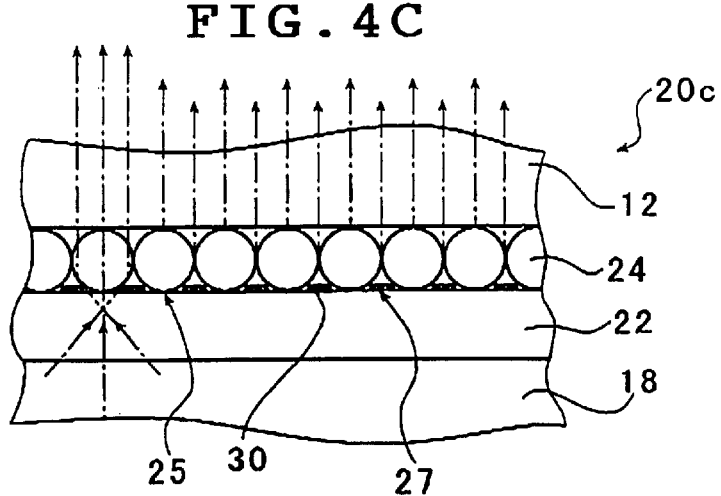

Note that the collimating plate 20b shown in FIG. 4B and the collimating plate 20c which is shown in FIG. 4C and described later share many components in common with the collimating plate 20a shown in FIG. 4A; therefore, like components are identified by like numerals and the following description is primarily directed to different portions.

A positive-acting light-sensitive, thermally developable material (hereunder referred to as a color-forming material) is a material which, upon exposure, forms exposed areas (latent images) and which forms no color in the exposed areas and a color in non-exposed areas upon subsequent heating. A preferred example is a color-forming material that contains heat-responsive microcapsules confining an electron-donating colorless dye, a compound having an electron-accepting portion and a polymerizable vinyl monomer portion in the same molecule, and a photopolymerization initiator. In this color forming material, the stated compound and photopolymerization initiator are present outside the heat-responsive microcapsules.

Upon exposure, the composition exterior to the heat-responsive microcapsules hardens; upon subsequent heating, the compound having the mobile electron-accepting portion and the polymerizable vinyl monomer portion, or an electron-accepting compound, moves around within the color forming material so that the electron-donating colorless dye within the microcapsules forms a color to produce a positive image.

Details of this color forming material are given in Unexamined Published Japanese Patent Application (kokai) No. 226174/1998. Besides, the light-sensitive, thermally developable materials described in Unexamined Published Japanese Patent Application Nos. 87827/1991 and 211252/1992 may also be used with advantage if they are positive-acting.

A heat-sensitive ablative material is a material that causes ablation (e.g., dissociation or release) upon heating to become removable. In the present invention, various heat-sensitive ablative materials can be employed as long as they can form a light-absorbing layer, preferably a black layer, and which causes ablation in a satisfactory manner upon light-induced heating.

Specific examples of the heat-sensitive ablative materials include: the material described in British Patent Publication No. 2,083,726 which contains a dye and a light absorbing substance in a color forming layer and which causes the dye to evaporate upon heating; the material described in U.S. Pat. No. 5,429,909 which has a color forming layer containing an image-forming dye, an infrared absorbing substance and a binder; and the materials described in Unexamined Published Japanese Patent Application Nos. 104173/1997 and 104174/1997 which contain resin materials such as nitrocellulose, cellulose acetate propionate and cellulose acetate, infrared absorbing substances such as carbon black, and optional ablation enhancers such as foaming agents (e.g., azides) and accelerators [e.g., 4,4'-diazidobenzophenone and 2,6-di(4-azidobenzal)-4-methylcyclohexanone].

The collimating plate 20*b* shown in FIG. 4B can be fabricated in the following manner. First, the aforementioned color forming material or heat-sensitive ablative materials, which is optionally dissolved or dispersed in a solvent, is applied to the support sheet 22 and dried to form a layer made of these ingredients (which is hereunder referred to as an ingredient layer).

Subsequently, beads 24 are fixed onto the ingredient layer. For example, a dispersion of the beads 24 in a binder is applied or, alternatively, the binder is first applied and the beads 24 are sprayed over the entire surface; thereafter, the binder is dried to fix the beads 24. Prior to fixing the beads 24, they may be pressed down or allowed to settle under gravity as in the aforementioned case so that they come into contact with the ingredient layer.

When the beads 24 are fixed in position, collimated light, preferably collimated to the same degree as the light issuing from the backlight 14, is launched into the collimating plate 20*b* from the side where the beads 24 are fixed. As a result, the incident light is refracted and launched into the ingredient layer (together with the light that has not been launched into the beads 24). On account of the refractive power of the beads 24, only the light transmitting areas 25 composed of the areas of contact between the beads 24 and the ingredient layer and the nearby areas become exposed, and the areas other than the light transmitting areas 25 constituting the blocking area 27 are not exposed. Because the light launched into the beads 24 converges on the light transmitting areas 25 by the beads 24 so that the ingredient layer such as the color forming material, heat-sensitive ablative material or the like in the light transmitting areas 25 can be exposed; however, the light launched into the ingredient layer in areas other than light transmitting areas 25 does not converge by the beads 24 so that the ingredient layer in the areas other than light transmitting areas 25 cannot be satisfactorily exposed.

In certain cases of the embodiment under consideration, the ingredient layer (black mask 28) may also exist between the beads 24 and the support sheet 22 to prevent them from making direct contact with each other. However, this phenomenon is optically negligible if the ingredient layer is formed thin enough.

In the case where the ingredient layer is formed of a color forming material, the areas affected by the passage of light through the beads 24 are exposed. In other words, only the areas of the ingredient layer through which the light has passed (light transmitting areas 25) are exposed to form no color after heating.

Subsequently, the ingredient layer is thermally developed, whereupon only the unexposed areas form a color to provide the black mask 28 which functions as the blocking area 27. As already mentioned, it is only the areas other than the light transmitting areas 25 composed of the areas of contact between the beads 24 and the ingredient layer and the nearby areas (through which the light refracted by the beads 24 passes) that form a color upon thermal development; hence, the black mask 28 functions as the blocking area 27 to ensure that no light is launched into the beads 24 from the areas other than the light transmitting areas 25.

In the case of using a heat-sensitive ablative material as the constituent material of the ingredient layer, the light that has been refracted by the beads 24 heats the heat-sensitive ablative material only in the light transmitting areas 25 composed of the areas of contact between the beads 24 and the ingredient layer and the nearby areas, whereupon the heat-sensitive ablative material in the heated areas is removed by ablation, whereas it is left intact in the blocking area 27 where no light has passed. Therefore, as in the aforementioned case of using the color forming material, the black mask 28 is formed that functions as the blocking area 27 to block the entrance of light into the beads 24 from the areas other than the light transmitting areas 25 composed of the areas of contact between the beads 24 and the ingredient layer and the nearby areas.

FIG. 4C shows in conceptual form another embodiment of the collimating plate of the invention. The collimating plate generally indicated by 20*c* is the same as the collimating plate 20*b* except that in place of the black mask 28, a light reflector for reflecting the incident diffused light back to the housing 18 is formed as the blocking area 27 in the areas other than the light transmitting areas 25 composed of the areas of contact between the beads 24 and the support sheet 22 and the nearby areas. In the illustrated case, the light reflector is a thin metal film 30 formed on the support sheet 22.

In this embodiment, the incident diffused light is also launched into the beads 24 only through the light transmitting areas 25 composed of the areas of contact between the beads 24 and the support sheet 22 and the nearby areas, thereby allowing for the emergence of satisfactory collimated light. In addition, as in the aforementioned embodiment of using the binder 26 as the light diffuser in the blocking area 27, all the light issued from the light sources 19 in the backlight 14 can be effectively utilized to permit highly efficient emergence of collimated light.

There is no particular limitation on the method of forming the thin metal film 30, such as, of aluminum (Al), copper (Cu) or the like, in the areas other than the light transmitting areas 25 composed of the areas of contact between the beads 24 and the support sheet 22 and the nearby areas and various methods may be employed to name just one example, a thin film of metal may be used.

If high-power collimated light as from a laser is applied to the thin metal film in the collimating plate 20*c* from the side where the beads 24 are provided, the light is made convergent in the areas of contact between the beads 24 and the thin metal film to generate intense heat, whereupon the metal is melted to produce spherical agglomerates under surface tension. The thin metal film has melted away, and the surrounding areas of the metal agglomerates become light-transmissive to form the light transmitting areas 25. On the other hand, the remaining metal film that has not melted away functions as the blocking area 27.

Another applicable method is as follows: using a thick metal film forming technique such as printing or a thin metal film forming technique such as sputtering or photolithography, something like an aperture grill of thin metal film having a multiple of openings that fit the size of the beads 24 to be used is formed on the support sheet 22 and the beads 24 are subsequently sprayed or otherwise applied to be fitted in the apertures; the beads 24 are then fixed with the binder or the like.

The collimating plate 20 of the invention can be thus fabricated.

In the thus fabricated collimating plate 20 of the invention, the open area ratio of the light transmitting areas 25 to the entire surface of the support sheet 22 lies preferably between 3 and 10%.

The open area ratio ($R_0$) of the light transmitting areas 25 is expressed by the equation shown below, and represents the ratio of the total surface area ($\Sigma s$) of all the light transmitting areas 25 to the surface area ($S_0$) of the entire surface of the support sheet 22, namely the total surface area ($S_0$) including the above total surface area ($\Sigma s$) and the whole surface area ($S_i$) of the blocking area 27. Thus, the open area ratio ($R_0$) of the light transmitting areas 25 is expressed by the following equation:

$$R_0 = \Sigma s / S_0$$

$$S_0 = \Sigma s + S_i$$

The reasons for limiting the open area ratio of the light transmitting areas 25 to 3–10% in the present invention are as follows: At an open area ratio of less than 3%, the efficiency of light passing through the collimating plate is not satisfactory, which makes it difficult to obtain lightness necessary for backlight. At an open area ratio exceeding 10% to the contrary, the efficiency of light passing through the collimating plate is satisfactory, but the ratio of the collimated light is lowered. That is, the collimating properties of the collimating plate are not sufficient for the emergence of the adequately convergent collimated light the intensity of which is attenuated by 50% at angles of no more than ±15 degrees (15 degrees in terms of absolute value), because oblique light is also incident on the collimating plate. As a result, collimated light that can be produced is not satisfactorily convergent, hence is not suitable for use as a backlight.

When the open area ratio of the light transmitting areas is 3%, the reflectance of the collimating plate 20, 80%, and the reflectance of the inner wall surface 18a of the housing 18, 80%, in the backlight 14 shown in FIG. 2 as fabricated using the collimating plate 20 shown in FIGS. 3A and 3B, the light utilization factor η can be calculated as follows:

First, three over one hundred (0.03 or 3%) of light issued from the light sources 19 emerges directly through the light transmitting areas 25, whereas the remaining light (1–0.03) (97%) is reflected by the collimating plate 20 at a reflectance of 0.8 (80%) and returned into the housing 18, where it is reflected by the inner wall surface 18a at a reflectance of 80%. Thereafter, three over one hundred (0.03) of the light emerges through the light transmitting areas 25, and the remaining light is reflected again by the collimating plate 20 and the inner wall surface 18a of the housing 18 in the same manner, thereby repeating the emergence of light through the light transmitting areas 25.

The light utilization factor η can be expressed by the following equation:

$$\eta = 0.03 + 0.03 \times (1 - 0.03) \times 0.8 \times 0.8 +$$
$$0.03 \times (1 - 0.03)^2 \times 0.8^2 \times 0.8^2 +$$
$$0.03 \times (1 - 0.03)^3 \times 0.8^3 \times 0.8^3 + \cdots$$
$$= 0.03 / \{1 - (1 - 0.03) \times 0.8 \times 0.8\}$$
$$= 0.079$$

The thus calculated light utilization factor η, 7.9% (0.079), is a satisfactory value for use, taking into consideration that the utilization factor of backlight in a common liquid-crystal display is 5–6%.

When the open area ratio of the light transmitting areas 25 is 5%, the reflectance of the collimating plate 20, 95%, and the reflectance of the inner wall surface 18a of the housing 18, 95%, the light utilization factor η in the backlight 14 can be calculated by the following expression:

$$\eta = 0.05 / \{1 - (1 - 0.05) \times 0.95 \times 0.95\}$$
$$= 0.35$$

and the result obtained is 35%. The value of 35% is significantly effective as the light utilization factor η of backlight.

While the collimating plate and the backlight system utilizing it according to the present invention have been described above in detail with reference to various embodiments, it should be understood that the invention is by no means limited to the foregoing embodiments and examples alone and various improvements and design modifications may of course be made without departing from the scope and spirit of the invention.

As will be understood from the foregoing description, the collimating plate and the backlight system utilizing it according to the invention have such outstanding light condensing characteristics that they can produce adequately convergent collimated light the intensity of which drops by 50% at angles of no more than ± 15 degrees. If the collimating plate of the invention is used as a collimator for a backlight device of a liquid-crystal display, or if the backlight system of the invention is applied to the backlight device of the light-crystal display, satisfactory collimated light can be launched into the liquid-crystal panel and the liquid-crystal display can provide a sufficiently good contrast ratio over a wide range of viewing angles to be advantageously used in medical applications.

What is claimed is:

1. A collimating plate comprising:
   a transparent support disposed on a light incident side;
   a plurality of light transmitting spheres fixed to said support in partial contact therewith on a light emitting side; and
   a light blocking area that blocks passage of light through areas other than light transmitting areas disposed on the light emitting side and comprising areas of contact between said transparent support and said light transmitting spheres and nearby areas,
   wherein said collimating plate produces collimated light having an intensity which drops by 50% at angles of no more than +/−15°.

2. A collimating plate comprising:
   a transparent support disposed on a light incident side;
   a plurality of light transmitting spheres fixed to said support in partial contact therewith on a light emitting side; and
   a light blocking area that blocks passage of light through areas other than light transmitting areas disposed on the light emitting side and comprising areas of contact between said transparent support and said light transmitting spheres and nearby areas,
   wherein an open area ratio of said light transmitting areas to a surface of said transparent support is 3–10%.

3. The collimating plate according to claim 1, wherein said light blocking area is one of a light diffusing device, a light absorbing device and a light reflecting device.

4. The collimating plate according to claim 3, wherein said light diffusing device comprises a binder that fixes said light transmitting spheres to said transparent support and in which a light diffusing substance having a refractive index of at least 1.3 is dispersed.

5. The collimating plate according to claim 3, wherein said light diffusing device has a reflectance of at least 80% at a thickness one half average diameter of said light transmitting spheres.

6. A backlight system comprising:

a collimating plate comprising a transparent support disposed on a light incident side, a plurality of light transmitting spheres fixed to said support in partial contact therewith on a light emitting side and a light blocking area that blocks passage of light through areas other than light transmitting areas disposed on the light emitting side and comprising areas of contact between said transparent support and said light transmitting spheres and nearby areas; and a housing that is optically closed by the collimating plate and that includes an inner surface having reflecting properties, wherein said collimating plate produces collimated light having an intensity which drops by 50% at angles of no more than +/−15°.

7. The backlight system according to claim 6, wherein the inner surface of said housing has a reflectance of at least 80%.

* * * * *